US009218905B2

(12) United States Patent
Vangool et al.

(10) Patent No.: US 9,218,905 B2
(45) Date of Patent: Dec. 22, 2015

(54) AC/DC CURRENT TRANSFORMER

(71) Applicant: Michael P. Vangool, Saskatoon (CA)

(72) Inventors: Michael P. Vangool, Saskatoon (CA); Geoffrey J. Baker, Martensville (CA)

(73) Assignee: LITTELFUSE, INC., Chicago, IL (US)

( * ) Notice: Subject to any disclaimer, the term of this patent is extended or adjusted under 35 U.S.C. 154(b) by 0 days.

(21) Appl. No.: 14/470,110

(22) Filed: Aug. 27, 2014

(65) Prior Publication Data

US 2014/0361761 A1 Dec. 11, 2014

Related U.S. Application Data

(62) Division of application No. 13/474,814, filed on May 18, 2012, now Pat. No. 8,847,573.

(60) Provisional application No. 61/488,475, filed on May 20, 2011.

(51) Int. Cl.

| | |
|---|---|
| ***H01F 38/28*** | (2006.01) |
| ***H01F 38/32*** | (2006.01) |
| *G06F 1/26* | (2006.01) |
| *H01F 38/30* | (2006.01) |

(52) U.S. Cl.
CPC ................ *H01F 38/28* (2013.01); *H01F 38/32* (2013.01); *H01F 2038/305* (2013.01)

(58) Field of Classification Search
CPC ............ G06F 1/26; G11C 5/14; H02H 3/331; H01F 38/28; H01F 38/32; G01R 15/183; G01R 15/186; G01R 19/15; G01R 19/0092
USPC ......................... 323/257, 258; 361/42, 57, 87
See application file for complete search history.

(56) References Cited

U.S. PATENT DOCUMENTS

| | | | | |
|---|---|---|---|---|
| 5,705,989 A * | 1/1998 | Cota | ...................... | G01R 19/15 324/127 |
| 6,479,976 B1 | 11/2002 | Edel | | |
| 6,984,979 B1 * | 1/2006 | Edel | ..................... | G01R 15/185 324/253 |
| 8,908,338 B2 * | 12/2014 | Kinsel | .................... | H02H 3/331 361/2 |

FOREIGN PATENT DOCUMENTS

| | | |
|---|---|---|
| EP | 0261707 A1 | 3/1988 |
| FR | 2430680 A1 | 2/1980 |
| JP | 07031049 H | 1/1995 |
| JP | 2001153893 A1 | 6/2001 |

OTHER PUBLICATIONS

"Improve your root-mean calculations", Brian Neunaber, Real-Time Digital Systems, EE Times—India. pp. 1-5, Feb. 2006.*
European Search Report from corresponding EP12790001.7 mailed Nov. 13, 2014.

* cited by examiner

*Primary Examiner* — Gary L Laxton
(74) *Attorney, Agent, or Firm* — Kacvinsky Daisak Bluni PLLC

(57) ABSTRACT

A method for processing output from a current transformer comprising deriving signal data from the output; converting the signal data from analog to digital format; removing a carrier signal from the signal data; squaring the signal data; and performing a recursive RMS algorithm on the signal data.

13 Claims, 5 Drawing Sheets

AC/DC CURRENT TRANSFORMER

RELATED CASES

This application claims the benefit of priority under 35 U.S.C. §119(e) to U.S. patent application Ser. No. 13/474,814, titled "AC/DC CURRENT TRANSFORMER," filed on May 18, 2012, which is hereby incorporated by reference in its entirety.

FIELD OF THE DISCLOSURE

The disclosure relates generally to the field of protective relay devices, and more particularly to a single-coil, toroid-type current transformer circuit for detecting both AC and DC current.

BACKGROUND OF THE DISCLOSURE

Current monitoring devices for AC electric power systems typically employ current transformers for providing input currents that are isolated from the conductors of the electric power system. For example, referring to the conventional current transformer CT1 shown in FIG. 1, a conductor 1 of a power system is configured as a primary winding of the current transformer CT1 and extends through a toroid magnetic core 2. The term "magnetic core" as used herein refers to a magnetic body having a defined relationship with one or more conductive windings. A secondary winding 3 is magnetically coupled to the magnetic core 2. The phrase "magnetically coupled" is defined herein to mean that flux changes in the magnetic core 2 are associated with an induced voltage in the secondary winding 3, wherein the induced voltage is proportional to the rate of change of magnetic flux in accordance with Faraday's Law.

Current flowing through the primary winding 1 and passing through the magnetic field of the magnetic core 2 induces a secondary current in the secondary winding 3, wherein the magnitude of the secondary current corresponds to a ratio (commonly referred to as the "CT ratio") of the number of turns in the primary and secondary windings 1 and 3. The primary winding 1 may include only one turn (as in FIG. 1) or may include multiple turns wrapped around the magnetic core 2. The secondary winding typically includes multiple turns wrapped around the magnetic core 2. The secondary winding 2 is connected to a protection relay (not shown) that measures the induced secondary current. The protection relay uses this measured current to provide overcurrent protection and metering functions.

Traditionally, protection relays and associated current transformers have been designed for electrical power systems that operate at fixed frequencies (e.g., 50/60 Hz). However, with the recent increase in the use of variable-frequency drives for controlling the operation of electric motors, there is a need for protection relays that employ current transformers that are capable of detecting both AC and DC faults.

FIG. 2 illustrates a prior art differential current sensor 10 that can detect AC and DC components of a differential current by utilizing an oscillating circuit. In particular, a summation current converter comprises two oppositely applied windings W1 and W2 having the same number of turns wound about a magnetic core M. During operation, the switches S1 and S2 of an oscillator are opened and closed in an alternating fashion so that the windings W1 and W2 carry current in alternation. The oscillating circuit changes state when the magnetic core M becomes saturated by the current in the windings W1 and W2. Upon saturation of the magnetic core M, there is no change in the current flowing through the current carrying winding W1 or W2, as the inductance of the winding W1 or W2 becomes negligibly slight so that no voltage can be induced at the control input of the switch S1 or S2 that has been closed, either. The switch S1 or S2 therefore opens. The opening of the switch S1 or S2 causes the voltage Ub (fixed direct supply voltage) to appear at the control input, and a corresponding induction voltage of the non-conducting winding W1 or W2 is formed. The previously opened switch S1 or S2 thereupon closes.

Because the switches S1 and S2 close in alternation, the current flow through the current sensor 10 results in a voltage drop at the measuring resistors Rm, which operate at frequencies that correspond to the oscillation frequency. By determining the difference between the voltage drops across the resistors Rm, the two branches of the oscillator can be evaluated. The differential voltage Udif can be considered to be a square wave voltage, thus facilitating recovery of the AC and DC components of the differential current therefrom.

While prior art AC/DC current sensors such as the one described above are generally effective for their intended purpose, they can be expensive. It would therefore be advantageous to provide a current sensor that is capable of detecting both AC and DC faults and that is relatively inexpensive.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In accordance with the present disclosure, a single-coil, toroid-type current transformer circuit for detecting both AC and DC current is provided. An embodiment of a current transformer circuit in accordance with the present disclosure may include a current transformer, an oscillator electrically connected to the current transformer, and a termination element electrically connected to the oscillator. The current transformer circuit may further include an open and short CT detection circuit electrically connected to the oscillator for facilitating determination of the connection and stability state of the current transformer. A processor may be electrically connected to an output of the open and short CT detection circuit for performing a series of operations on signal data generated by the open and short CT detection circuit and manipulating the operation of an electrical power system accordingly.

A method for processing output from a current transformer in accordance with the present disclosure may include deriving signal data from the transformer output and converting the signal data from analog to digital format. The method may further include removing an oscillator carrier signal from the signal data, squaring the signal data, and performing a recursive RMS algorithm or similar algorithm on the signal data.

BRIEF DESCRIPTION OF THE DRAWINGS

By way of example, specific embodiments of the disclosed device will now be described, with reference to the accompanying drawings, in which.

DETAILED DESCRIPTION

A single-coil, toroid-type current transformer circuit for detecting both AC and DC current is provided. The current transformer circuit may include a current transformer, an oscillator electrically connected to the current transformer, and a termination element electrically connected to the oscillator. An open and short CT detection circuit electrically connected to the oscillator may be used for facilitating determination of the connection and stability state of the current transformer. In addition, a processor may be electrically connected to an output of the open and short CT detection circuit for performing a series of operations on signal data generated by the open and short CT detection circuit and manipulating the operation of an associated electrical power system based on desired parameters. The invention is not limited to the specific embodiments described below.

Figure 1:
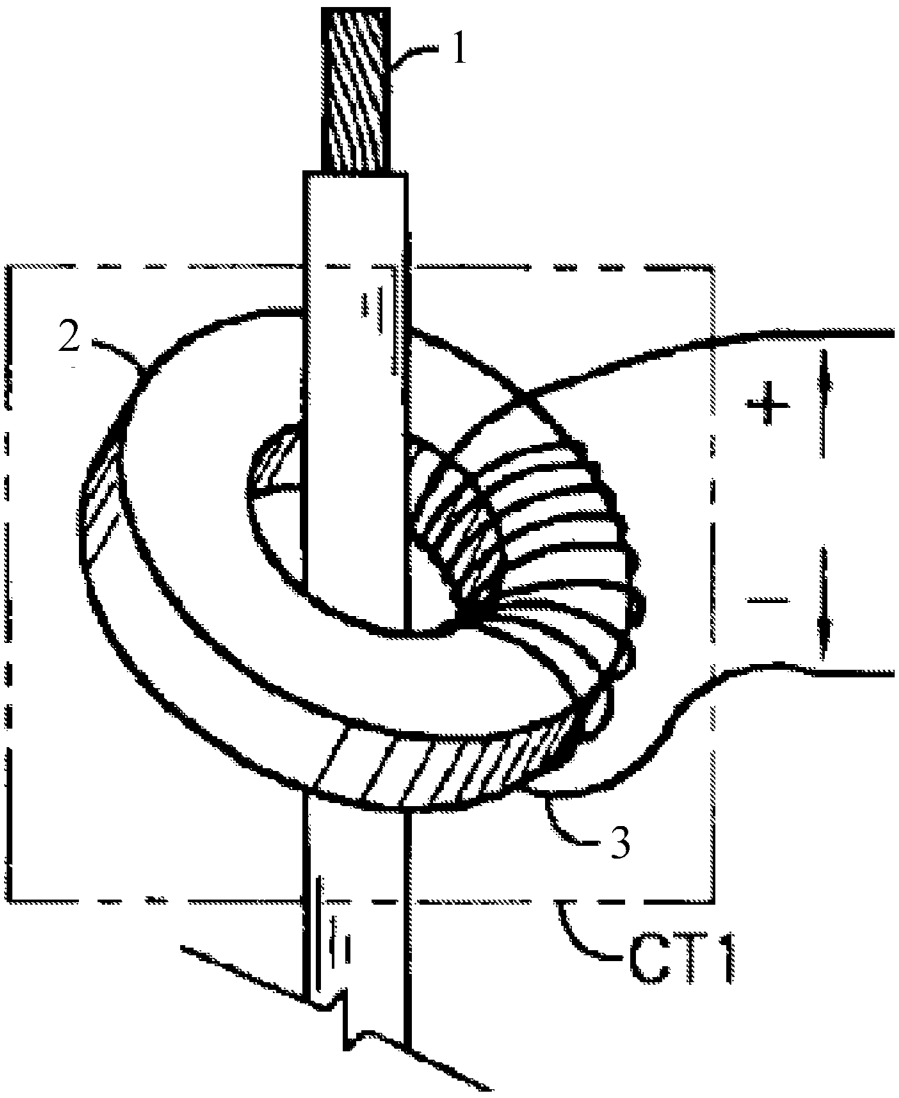
FIG. 1 (Prior art)
FIG. 1 is a schematic diagram illustrating a conventional current transformer.
Figure 2:
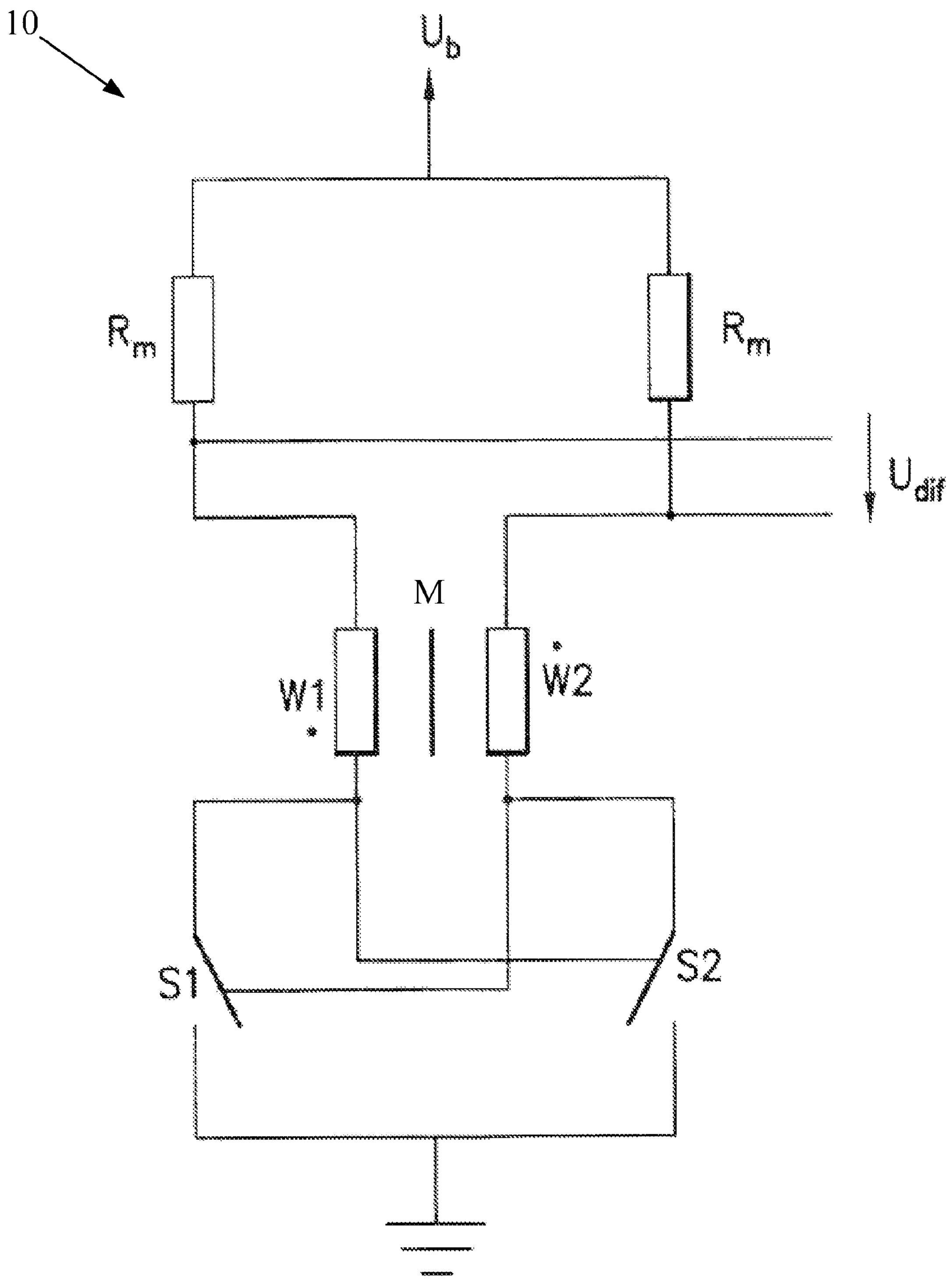
FIG. 2 (Prior art)
FIG. 2 is a schematic diagram illustrating a prior art current transformer circuit.
Figure 3:
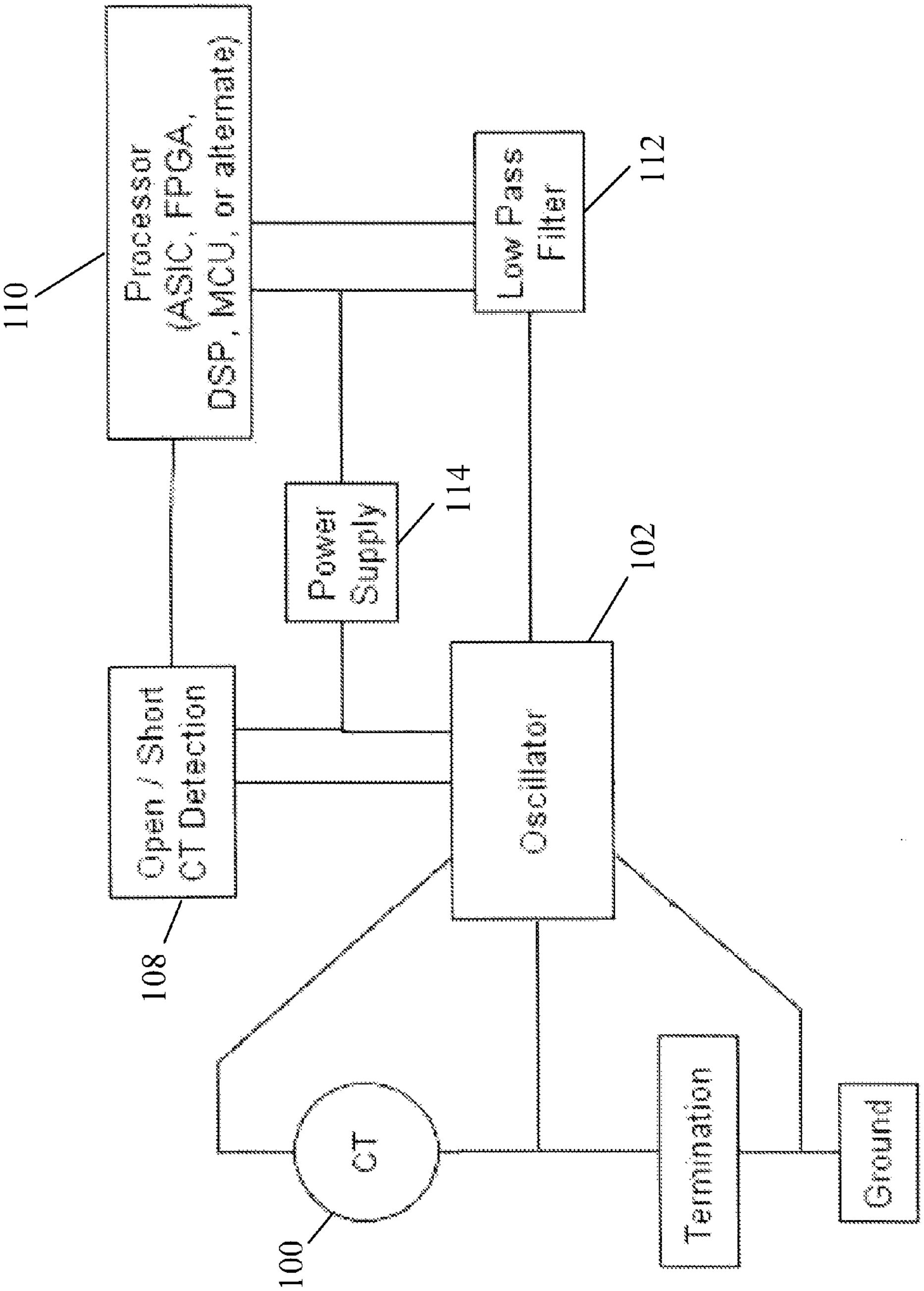
FIG. 3 is a schematic block diagram illustrating an exemplary embodiment of a current transformer circuit in accordance with the present disclosure.

FIG. 3 is a block diagram of an exemplary embodiment of an AC/DC current transformer (CT) circuit in accordance with the present invention. The circuit may include a CT 100 having a core (not shown) formed of a suitable core material, such as iron or any of a variety of other metals that will be familiar to those of ordinary skill in the art. Alternatively, it is contemplated that the CT 100 may have an air core. The CT 100 may further include a single winding (not shown) that is wrapped around the core and that forms a primary of the CT 100. In a non-limiting, exemplary embodiment of the CT 100, the core may be composed of a magnetic material such that 100 turns of the primary around the core results in an inductance in a range of about 200 mH and about 300 mH. Of course, varying the number of turns in the primary, and thus the inductance, will result in embodiments of the CT 100 having different frequency responses and current-measurement ranges.

An oscillator 102 may be electrically connected to the CT 100. The oscillator 102 may be an RL multivibrator that is tuned by the inductance of the CT 100. By varying the inductance across the terminals of the oscillator 102, the timing and measurement characteristics of the CT circuit can be changed. Particularly, the inductance of the CT 100 cooperates with the oscillator 102 to force the CT 100 into positive and negative saturation in an oscillating manner. A load resistor (not shown) may be placed in series with the secondary winding of the CT 100. The voltage across this resistor facilitates determination of the secondary coil current. The average value of the voltage across the resistor varies with the DC current in the primary winding of the CT 100. Thus, the oscillation frequency of the oscillator 102 determines the primary current frequency range that can be detected as further described below.

In an exemplary embodiment, the oscillation frequency is selected to allow detection of DC faults and fault frequencies in a range of approximately 0 Hz to 100 Hz. The secondary saturation current of the CT 100 thus determines the current range that can be detected as further described below. An exemplary embodiment of the present disclosure may employ an AC current transformer with a CT ratio of approximately 100:1 and a detection range of approximately 0 to 7 Amperes DC and approximately 0 to 5 Amperes AC.

An open and short CT detection circuit 108 may also be electrically connected to the oscillator 102 and may be configured to work in combination with the oscillator 102 to facilitate determination of the connection and stability state of the CT 100. The oscillator 102 operates with an inductance as represented by the CT 100. This relationship is exploited via the open/short CT detection circuit 108 to create a frequency monitor of the oscillating signal.

An output of the open and short CT detection circuit 108 may be electrically connected to an input of a processor 110. The processor 110 thereby receives information relating to the connection and stability state of the CT 100 from the open and short CT detection circuit 108 and is configured to manipulate the operation of an electrical power system (not shown) to which the CT circuit is connected accordingly. For example, when the CT 100 is operatively connected, the processor 110 may monitor and record the oscillating frequency. If the frequency rate drops to zero, then this situation is detected as a shorted or open CT 100 connection by the processor 110. Additionally, this oscillating signal changes with respect to the current passing through the primary of the CT 100, and thus the processor 110 may monitor the frequency and time variations of the oscillating signal in order to measure the current. This could be performed either as a validation of the data entering the processor 110 through an anti-aliasing filter 112, or in place of the anti-aliasing filter 112.

If the processor detects a fault condition, the processor 110 may generate an output signal that interrupts the delivery of electrical power from the electrical power system to a load, for example. The processor 110 may be, for example, an application specific integrated circuit (ASIC), field-programmable gate array (FPGA), digital signal processor (DSP), microcontroller unit (MCU), or other computing device capable of executing algorithms configured to extract information from the oscillation signal generated by the oscillator 102 to determine the RMS value of the current passing through the primary winding of the CT 100.

The processor 110 should also be capable of monitoring the output signal from the open and short CT detection circuit 108 and interrupting the operation of an electrical power system as described above. An appropriately-configured anti-aliasing filter 112, such as my be embodied by a low pass filter, may be electrically connected intermediate the oscillator 102 and the processor 110 to ensure that the processor 110 does not receive frequency signals outside of a desired range, such as above 1000 kHz or as defined by the sampling rate of the processor 110 and dictated by Nyquist theorem.

A power supply 114 may be electrically connected to any or all of the oscillator 102, the open and short CT detection circuit 108, the processor 110, and the anti-aliasing filter 112 for providing electrical power thereto.

Figure 4:
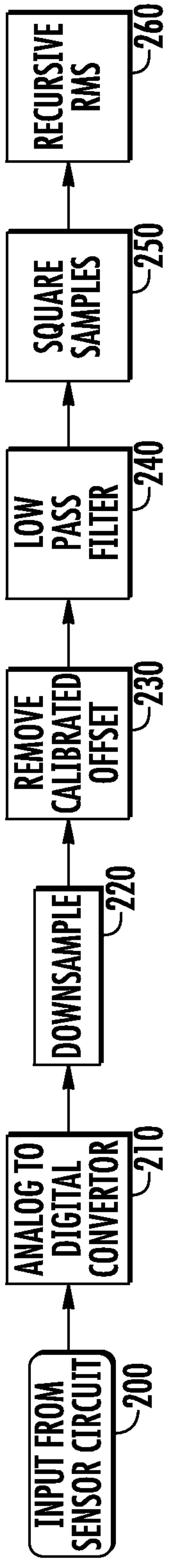
FIG. 4 is a process flow diagram illustrating a measurement algorithm in accordance with the present disclosure.

FIG. 4 is a flow diagram of an exemplary embodiment of a processing algorithm for the processor 110 described above. It will be appreciated that this particular processing algorithm is merely one example of many different algorithm's that can be implemented by the processor 110 without departing from the present disclosure. At block 200 in FIG. 4, the processor 110 (see FIG. 3) receives signal data from the anti-aliasing filter, implemented using a low-pass filter block 112 and the open and short detection circuit 108.

At block 210, the processor converts the received signal data from its original analog form into a digital format so that the signal can be processed and analyzed to determine power system properties. A down sample process is optionally performed at block 220. The down sample process presents an opportunity to over sample the input data signal and then down sample the signal to ensure that a desired sampling rate and timing are achieved.

At block 230, the processor 110 performs an optional calibration process which removes a calibrated offset corresponding to the particular CT 100 from the data signal to ensure that the CT circuit can be operated using any of a variety of different CT's having a correspondingly wide range of inductive properties. This calibration step monitors and tunes the algorithms executed by the processor 110 in order to track fault conditions such as the CT status, overcurrents, the true zero point of the power system, and the scale of the outputs from the power system. At block 240, a low pass filter removes the carrier signal which is the oscillation signal. That is, the oscillation signal acts as a carrier signal in a magnetic modulation scheme in which the current passing through the primary winding of the CT 100 will be magnetically mixed with the carrier signal. Thus, in order to retrieve the magnetic modulation data, the oscillation is removed.

At block 250, the processor 110 squares the individual sampled signal data, thereby initiating an RMS computation process. Particularly, the RMS computation process adjusts all incoming data signals to be centered around an RMS value instead of zero, or ground. Next, at block 260, the processer 110 executes a recursive RMS algorithm that smoothes the incoming signal data over time and tracks the RMS value while removing signal data that is not representative of an RMS signal. Those of ordinary skill in the art will recognize that other algorithms can be substituted for the recursive RMS algorithm for achieving a similar result without departing from the present disclosure. Upon execution of the RMS algorithm, the processor 110 compares the computed data against the set point defined by the operator. If the measured current exceeds a threshold, the processor toggles an indication circuit in order to notify a breaker or similar disconnect device to remove power from the faulted area before significant damage occurs.

Figure 5:
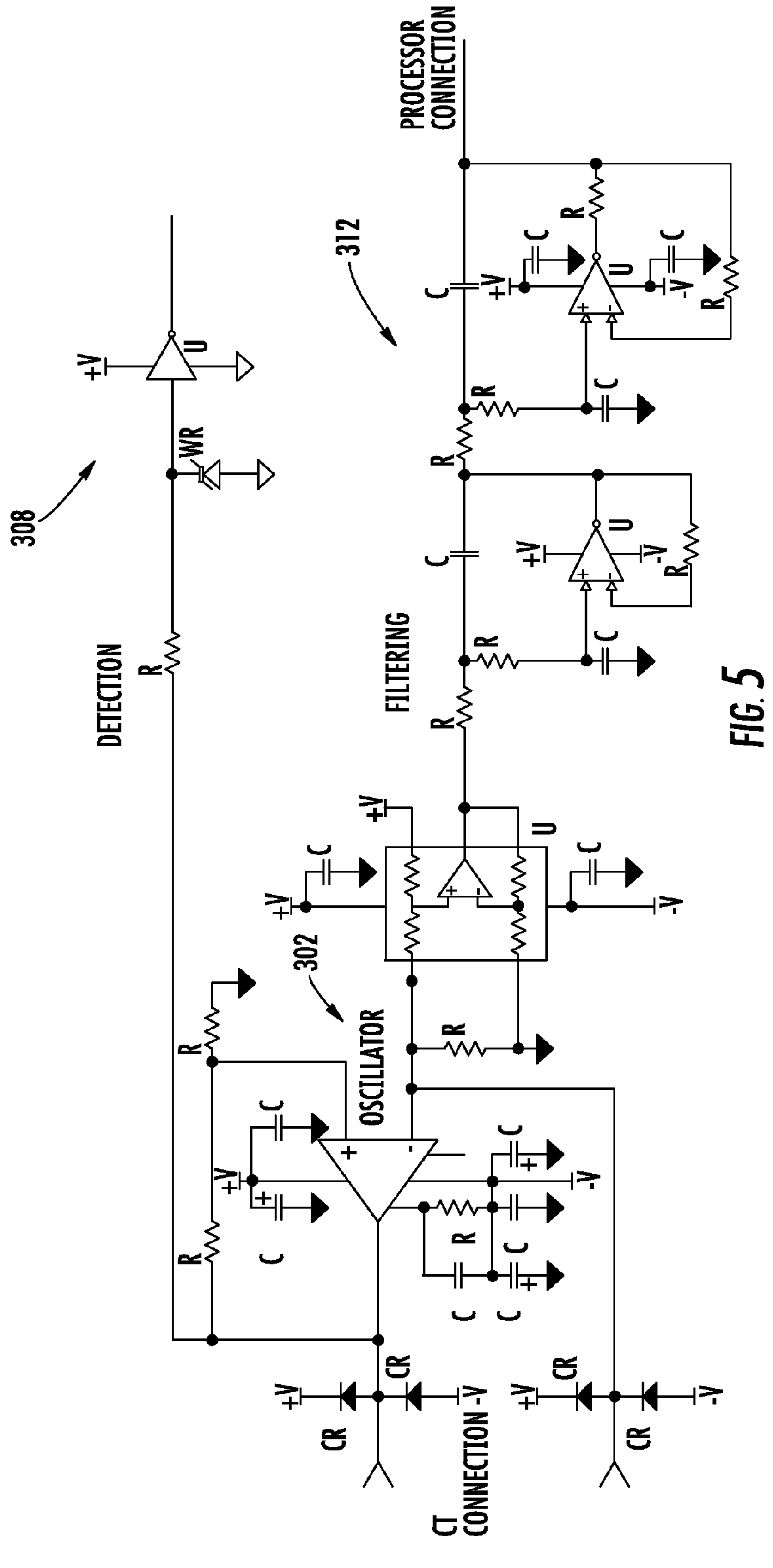
FIG. 5 is a detailed schematic diagram of a current transformer circuit in accordance with the present disclosure.

FIG. 5 is a schematic diagram illustrating a more detailed exemplary implementation of the CT circuit described above with reference to the block diagram shown in FIG. 3. Particularly, the oscillator 102 may be implemented using a power operational amplifier 302, the open and short CT detection circuit 108 may be implemented using a clocking counter 308, and the low pass filter 112 may be implemented using a series of operational amplifiers 312. Of course, it will be appreciated that the exemplary circuit shown in FIG. 5 represents only one of many possible implementations of the CT circuit of the present disclosure.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The various embodiments or components described above, for example, the CT circuit and the components or processors therein, may be implemented as part of one or more computer systems, which may be separate from or integrated with the circuit. The computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention, for example, for generating two antenna patterns having different widths. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The invention claimed is:

1. A method for processing output from a current transformer comprising:
- deriving signal data from the output;
- converting the signal data from analog to digital format;
- removing a carrier signal from the signal data; squaring the signal data; and
- performing a recursive RMS algorithm on the signal data.

2. The method of claim 1, further comprising deriving the signal data by using an open and short CT detection circuit.

3. The method of claim 1, further comprising receiving the signal data from an anti-aliasing filter implemented by using a low-pass filter and a open and short CT detection circuit.

4. The method of claim 3, further comprising using the low-pass filter for removing the carrier signal from the signal data.

5. The method of claim 1, further comprising down sampling the signal data.

6. The method of claim 1, further comprising calibrating the signal data.

7. The method of claim 1, further comprising analyzing the signal data for determining properties of an electrical power system after converting the signal data from the analog to the digital format.

8. The method of claim 1, further comprising squaring the signal data for initiating a recursive RMS algorithm.

9. The method of claim 8, further comprising smoothing the signal data over time using a recursive RMS algorithm.

10. The method of claim 9, further comprising tracking an RMS value using the recursive RMS algorithm.

11. The method of claim 1, further comprising adjusting the signal data to be centered around an RMS value instead of a zero value.

12. The method of claim 1, further comprising manipulating the delivery of electrical power in an electrical power system according to a result of the recursive RMS algorithm.

13. The method of claim 1, further comprising interrupting the delivery of electrical power in the electrical power system if a result of a recursive RMS algorithm exceeds a threshold.

* * * * *